(12) United States Patent
Herwig et al.

(10) Patent No.: US 12,241,993 B2
(45) Date of Patent: Mar. 4, 2025

(54) PISTON AND CYLINDER UNIT INCLUDING A PISTON POSITION DETECTION UNIT AND A COLLIMATOR

(71) Applicant: Precision Nanosensors Inc., Millbrae, CA (US)

(72) Inventors: Karl-Wilhelm Herwig, Witzenhausen (DE); Alexander Pik, Eschwege (DE); Günter Leicht, Stegaurach (DE)

(73) Assignee: Pacoma GmbH, Eschwege (DE)

( * ) Notice: Subject to any disclaimer, the term of this patent is extended or adjusted under 35 U.S.C. 154(b) by 511 days.

(21) Appl. No.: 17/401,621

(22) Filed: Aug. 13, 2021

(65) Prior Publication Data

US 2022/0057477 A1    Feb. 24, 2022

(30) Foreign Application Priority Data

Aug. 20, 2020  (EP) .................................... 20191865

(51) Int. Cl.
  *G01S 7/03*   (2006.01)
  *G01S 13/32*  (2006.01)
  (Continued)

(52) U.S. Cl.
  CPC ............. *G01S 7/03* (2013.01); *H01Q 19/062* (2013.01); *G01S 13/32* (2013.01); *H01Q 9/0407* (2013.01)

(58) Field of Classification Search
  CPC ......... G01S 7/03; G01S 13/32; H01Q 19/062; H01Q 9/0407
  See application file for complete search history.

(56) References Cited

U.S. PATENT DOCUMENTS

| | | | |
|---|---|---|---|
| 4,439,847 A | * | 3/1984 | Massa .................... G10K 11/20 310/335 |
| 7,095,944 B2 | | 8/2006 | Trummer |

(Continued)

FOREIGN PATENT DOCUMENTS

| | | |
|---|---|---|
| CA | 2279567 A1 | 2/2000 |
| CN | 101460812 A | 6/2009 |

(Continued)

OTHER PUBLICATIONS

DE102016120665EPOtranslation.pdf, machine translation of DE-102016120665-B3 (Year: 2018).*

(Continued)

*Primary Examiner* — Timothy A Brainard
*Assistant Examiner* — Kenneth W Good
(74) *Attorney, Agent, or Firm* — The Sladkus Law Group

(57) ABSTRACT

A piston and cylinder unit of a working machine, for example a wheel loader, excavator, tipper or crane serves to steer, pivot, lift or provide other movements of the working machine or of a tool. The piston and cylinder unit includes a cylinder, a piston being arranged in the cylinder to be axially movable along a longitudinal center axis and a piston position detection unit. The cylinder includes a mounting bore extending radially in the cylinder. The piston position detection unit is arranged in the mounting bore and detects the axial position of the piston in the cylinder by high frequency technology. The piston position detection unit includes an antenna for sending and receiving high frequency signals. A collimator is arranged in the beam path of the antenna. The antenna has a main sense of direction of radiation extending parallel to the longitudinal center axis.

19 Claims, 17 Drawing Sheets

(51) Int. Cl.
*H01Q 9/04* (2006.01)
*H01Q 19/06* (2006.01)

(56) References Cited

U.S. PATENT DOCUMENTS

| | | | |
|---|---|---|---|
| 7,492,165 | B2 | 2/2009 | Maier |
| 10,892,537 | B2 | 1/2021 | Hofherr |
| 2013/0312601 | A1 | 11/2013 | Subrt |
| 2015/0122012 | A1* | 5/2015 | Tokuyasu .............. G01F 1/6842 |
| | | | 73/204.22 |
| 2021/0320463 | A1* | 10/2021 | Grünewald ............. F15B 15/08 |

FOREIGN PATENT DOCUMENTS

| | | | |
|---|---|---|---|
| DE | 3127116 C3 * | 7/1981 | |
| DE | 1990 3183 A1 | 8/2000 | |
| DE | 20 2014 001 604 U1 | 5/2015 | |
| DE | 20 2015 101 681 U1 | 7/2016 | |
| DE | 10 2016 106 747 A1 | 10/2017 | |
| DE | 102016120665 B3 * | 4/2018 | |
| EP | 1 752 792 A1 | 2/2007 | |
| EP | 2 966 725 A1 | 1/2016 | |
| EP | 3 667 813 A1 | 6/2020 | |
| EP | 3772595 B1 * | 8/2023 | .......... F15B 15/2815 |
| WO | 03069269 A2 | 8/2003 | |

OTHER PUBLICATIONS

17401621_2023-12-09_DE_3127116_C3_M.pdf, machine translation of DE 3127116 C3 (Year: 1981).*
17401621_2024-12-18_EP_3772595_B1_H.pdf, machine translation of EP-3772595-B1 (Year: 2023).*

* cited by examiner 57, 58

PISTON AND CYLINDER UNIT INCLUDING A PISTON POSITION DETECTION UNIT AND A COLLIMATOR

CROSS REFERENCE TO RELATED APPLICATIONS

This application claims priority to co-pending European Patent Application No. 20 191 865.3 filed Aug. 20, 2020.

FIELD OF THE INVENTION

The invention relates to a piston and cylinder unit including a cylinder, a piston being supported in the cylinder to be axially movable and a piston position detection unit detecting the axial position of the piston in the cylinder.

Such piston and cylinder units are especially used in working machines, construction machines, agricultural machines, maritime machines and mechanical engineering. The units are especially hydraulic piston and cylinder units.

The position of the piston in the cylinder often serves to attain a defined position of a tool being indirectly connected to the piston, and it is thus determined.

BACKGROUND OF THE INVENTION

A piston and cylinder unit including a cylinder, a piston being supported in the cylinder to be axially movable and a piston position detection unit detecting the axial position of the piston in the cylinder is known from German patent DE 10 2016 120 665 B3. In the embodiment illustrated in FIG. 9, the piston position detection unit is arranged in a mounting bore extending radially in the cylinder and including a lens. A mirror is provided for deflecting the beam of the incoming and outgoing radar radiation.

A piston and cylinder unit including a cylinder, a piston being supported in the cylinder to be axially movable and a piston position detection unit detecting the axial position of the piston in the cylinder by high frequency technology is known from German utility model DE 20 2014 001 604 U1.

A piston and cylinder unit including a cylinder, a piston being supported in the cylinder to be axially movable and a piston position detection unit detecting the axial position of the piston in the cylinder by high frequency technology is known from US American patent application US 2013/0312601 A1.

A piston and cylinder unit including a cylinder, a piston being supported in the cylinder to be axially movable and a piston position detection unit detecting the axial position of the piston in the cylinder by high frequency technology is known from international patent application WO 03/069269 A2 corresponding to U.S. Pat. No. 7,095,944 B2. The piston position detecting unit includes a coupling probe, a retaining system and a waveguide being arranged in a plurality of axial bores in the cylinder head of the cylinder of the piston and cylinder unit.

In the prior art of hydraulic piston and cylinder units of working machines, piston position detection units determining the axial position of the piston in the cylinder by magnetostrictive sensors are generally known. The structure of such magnetostrictive sensors is comparatively technically complex and expensive.

A distance measuring apparatus including a microwave antenna arrangement is known from European patent application EP 1 752 792 A1 corresponding to U.S. Pat. No. 7,492,165 B2.

A waveguide coupling apparatus and a positioning sensor apparatus for a hydraulic cylinder are known from German patent application DE 10 2016 106 747 A1 corresponding to U.S. Pat. No. 10,892,537 B2.

SUMMARY OF THE INVENTION

The present invention relates to a piston and cylinder unit including a cylinder, a piston being supported in the cylinder to be axially movable and a piston position detection unit. The piston and cylinder unit has a longitudinal center axis, the piston being supported to be axially movable along the longitudinal center axis. The cylinder includes a mounting bore extending radially in the cylinder. The piston position detection unit is arranged in the mounting bore. The piston position detection unit serves to determine the axial position of the piston in the cylinder by high frequency technology, and it includes an antenna for sending and receiving high frequency signals. A collimator is arranged in the beam path of the antenna. The antenna has a main sense of direction of radiation extending parallel to the longitudinal center axis.

The invention also relates to a piston position detection unit for detecting the position of a piston in a cylinder of a piston and cylinder unit. The piston position detection unit includes a cylindrical housing having a longitudinal center axis. The piston position detection unit includes an electronic unit being arranged in the housing and including an antenna for sending and receiving high frequency signals through the housing. The main sense of direction of radiation of the antenna extends perpendicularly to the longitudinal axis of the housing. A collimator is at least partly arranged in the housing or forms part of the housing, and is located in the beam path of the antenna.

With the new piston and cylinder unit and the new piston position detection unit, it is possible to exactly determine the axial position of the piston in the cylinder with little structural effort.

The term of high frequency technology as used in this application is to be understood according to its broad interpretation, i.e. to cover all frequencies between approximately 3 MHz and approximately 30 THz. Especially, it is not to be understood according to the narrow definition of the International Telecommunications Union according to which the frequency range of high frequency technology only covers frequencies between 3 MHz 30 MHz.

The main components of the piston and cylinder units are a piston and a cylinder. The cylinder is to be understood as a greater unit which especially includes the sub-components of a cylinder tube and of a cylinder head. A piston is to be understood in this application as the component which moves in the cylinder tube and which forms a closed chamber with the cylinder tube. The piston is especially connected to a piston rod.

The piston and cylinder unit especially is a hydraulic piston and cylinder unit. However, it may also be a pneumatic piston and cylinder unit.

The detection, determination, evaluation, adjustment and provision of the position of the piston in the cylinder of a piston and cylinder unit is of interest in the technical field of working machines for different reasons. For example, it may be desired to securely reach a defined end position of the piston and thus of the tool of the working machine being indirectly connected to the piston. An automation in the sense of computer-controlled attaining of different positions of the pistons after one another and a programmable order are also possible. Furthermore, allowable working regions within which the piston and cylinder unit may move, can be defined and reliably complied with. It is also possible to prevent an overload of the piston and cylinder unit by observing the position of the piston and the load. The load acting upon the piston and the cylinder can be determined by measuring pressure, temperature and position. Appropriate measures can be proposed or initiated when there is an overload.

For example, the working machine may be a wheel loader, excavator, tipper, crane or stacker or a lifting platform. The piston and cylinder unit especially serves to steer, support, extend, pivot, lift or for other movements of the working machine or of a tool or a different part of the working machine.

The collimator improves precision of the piston position detection unit in a plurality of ways, and it leads to improved measuring results when determining the position of the piston. A collimator is to be understood as an optical apparatus for generating a beam path of parallel beams from previously non-parallel beams of divergent sources. In a first sense of direction of radiation, the collimator converts non-parallel beams into parallel beams. In the opposite second sense of direction of radiation, the collimator bundles the parallel beams entering the collimator. These two properties are used in the present determination of the position of the piston in the cylinder by high frequency radiation and high frequency signals, respectively, in an advantageous way.

The main sense of direction of radiation of the antenna extends parallel to the longitudinal center axis of the piston and cylinder unit. The longitudinal center axis thus corresponds to the axis along which the piston moves back and forth. "Parallel" is to be understood in a broader sense and either means "really parallel" or identical.

The first sense of direction of radiation is associated with the receiving function of the piston position detection unit, i.e. the beams that had already been reflected now initially come cross the collimator on their way back to the piston position detection unit. In this case, the collimator functions as a filter that only—or at least substantially only—focuses and returns, respectively, the beams that had previously been directed parallel with respect to one another and to the longitudinal axis of the piston onto the piston position detection unit. In this way, the beams and the signals, respectively, not—or at least not directly—originating from the piston bottom surface located at the end are filtered out. Such undesired radiation traces back to the fact that in reality reproduction of the collimator is not ideal, the beams are not transmitted and received ideally punctiform and the piston bottom surface is not ideally plain. Thus, for example, beams are reflected from the piston bottom surface onto the inner wall of the cylinder tube, and they only after reach the collimator. These beams do not allow for an exact statement concerning the position of the piston in the cylinder tube. With the new collimator, these beams and signals, respectively, are entirely or partly filtered out since they do not return to the transmitter of the piston position detection unit and they are not part of the measuring result.

The second sense of direction of radiation is associated with the transmitting function of the piston position detection unit, i.e. the beams which are transmitted by the transmitter of the piston position detection unit and which initially encounter the collimator. In this case, the collimator acts as an amplifier transmitting more beams in a way that they encounter the piston bottom surface directly and perpendicularly. These beams extend parallel with respect to one another and to the longitudinal axis of the piston.

In this way, signal quality (signal-to-noise ratio) is substantially improved. This leads to an increase of the exactness of the measuring results especially in case of greater distances between the piston bottom surface and the cylinder head.

The collimator may include an dielectric lens. With such a dielectric lens, the desired generation of parallel beams can be realized well for the underlying high frequency signals. The collimator may include one dielectric lens or a combination of a plurality of dielectric lenses. However, the collimator may also be designed in a different way, and, for example, it may include a Fresnel zone plate.

The dielectric lens includes a lens body having a convexly shaped lens surface. The lens body is made of a dielectric material, for example a dielectric plastic material or a dielectric ceramic material. For example, the dielectric material may include polytetrafluorethylene, polyethylene or polypropylene.

The dielectric lens has a good permeability for the high frequency radiation. It has a dielectric constant (permittivity) being greater than the one of air and being greater than the one of the hydraulic medium in the piston and cylinder unit. For example, the permittivity of the dielectric lens may be between 20% and 50% greater than the one of the hydraulic medium in the piston and cylinder unit. The permittivity difference and the curvature of the lens are coordinated with one another.

The dielectric lens may have a planar-convex lens shape. The convex side of the lens faces towards the piston. The planar side faces towards the receiver of the piston position detection unit. However, other lens shapes are also possible.

The signals being sent by the substantially punctiform sender of the piston position detection unit through air thus initially encounter the planar side of the dielectric lens. From there, they are refracted towards the direction of the central axis of the lens since the permittivity of the material of the lens is greater than the permittivity of air. To attain the desired orientation parallel to the longitudinal axis of the piston, the curvature angle of the convex side of the lens is chosen such that the required refraction angle results at each point.

The collimator may be a part of the piston position detection unit and especially an integral part of the piston position detection unit. The collimator is thus integrated into the piston position detection unit, and these elements form a common integral structural unit, respectively. However, it is also possible that the collimator is structurally separate from the piston position detection unit and that they only functionally form a unit.

The piston position detection unit may be designed as a compact cartridge including the sensor as well as the evaluation electronics. Consequently, during assembly and disassembly, respectively, the entire piston position detection unit is inserted and removed, respectively.

However, it is also possible that the housing of the piston position detection unit is fixedly mounted in the cylinder and that the electronic unit is inserted into and removed from the housing, respectively, in the mounted position of the housing. In this way, replacement of the piston position detection unit is possible without having to disassemble the piston and cylinder unit. Replacement of the electronic unit may then be realized at the cylinder being completely filled with oil. Thus, emptying, filling and venting of the cylinder are not necessary.

The mounting bore extending radially in the cylinder can be easily created in the cylinder, especially by drilling. This starts at the outer surface of the cylinder head.

The mounting bore may have a diameter being comparatively small compared to its length such that the mounting bore has a low space requirement in the axial direction of the piston and cylinder unit. In this way, it can be considered without problems in a new construction of a piston and cylinder unit and added to existing piston and cylinder units. Consequently, an integration of the new piston position detection unit does not require a geometrical change of the piston and cylinder unit compared to a piston and cylinder unit not including such a piston position detection unit. In addition, there is no substantial weakening of the structure of the cylinder.

The cylinder may include a cylinder head. In this case, the mounting bore is arranged in the cylinder head of the piston and cylinder unit. The piston position detection unit may be arranged in the mounting bore such that its longest dimension extends radially in the cylinder head. In this way, the existing installation space of the cylinder head for the arrangement of the piston position detection unit is effectively used.

The mounting bore may be operatively connected to the interior of the cylinder by an axially extending sensor signal bore. This sensor signal bore allows for the necessary sending and receiving of the high frequency sensor signals used for the detection of the position. In case the piston and cylinder unit is a hydraulic piston and cylinder unit, this sensor signal bore is filled with hydraulic oil.

The mounting bore may be connected to the surroundings by a compensation bore. In this way, assembly of the piston position detection unit in the otherwise closed mounting bore being sealed by the piston position detection unit is simplified. However, it is also possible not to arrange such a compensation bore and to accept a certain compression of the air in the mounting bore.

For example, the compensation bore may be arranged in the housing—especially in the bottom of the housing—of the piston position detection unit. However, it is also possible that the compensation bore is located in the cylinder. The compensation bore may be arranged in an axial end portion of the mounting bore facing away from the opening of the mounting bore.

The sensor signal bore through which the signals are sent does not extend over the entire cylinder head bottom surface. The remaining annular, closed cylinder head bottom surface reflects signals that originate from the piston bottom surface. These already reflected signals then usually again reach the piston bottom surface, they are again reflected thereby and then eventually pass through the sensor signal bore and encounter the receiver of the piston position detection unit. The position of the piston cannot be correctly determined from such a signal. To overcome this problem or to at least reduce this problem, the cylinder head may have a cylinder head bottom surface surrounding the sensor signal bore, a plurality of beam deflecting elements being arranged in the cylinder head bottom surface. The beam deflecting elements fulfill another filtering function by intentionally deflecting the above-described beams that had already been reflected for a plurality of times. The beams are deflected such that their angle strongly deviates from the longitudinal axis of the piston. In this way, the path of the signals through the hydraulic medium is prolonged and dampening of the signals is correspondingly increased. Eventually, these signals do not reach the receiver of the piston position detection unit at all or with a lower probability and/or only dampened. In this way, signal quality is further improved.

The collimator may be arranged in the housing of the piston position detection unit. It is also possible that the collimator partly forms the housing. The collimator may be made of the same material as the remainder of the housing, or it may be made of a different material. However, it is also possible that the collimator is located outside of the housing. In this case, the collimator is especially arranged in the sensor signal bore.

The beam deflecting elements may be designed as recessed elements. Especially, they may be spaced apart conical impressions in the cylinder head bottom surface.

The beam deflecting elements may be arranged to be spaced apart over a part of the cylinder head bottom surface or over the entire cylinder head bottom surface. In case of only a part, the beam deflecting elements are preferably arranged in the region of the cylinder head bottom surface surrounding the sensor signal bore.

The piston position detection unit may include a housing and an electronic unit being arranged in the housing. The electronic unit may be sealed against the interior of the cylinder by the housing. In this way, the intrusion of hydraulic oil into the interior of the piston position detection unit is prevented by the housing. The core element of the piston position detection unit—namely the electronic unit—is located in this interior. The electronic unit at least fulfills the function of sending and receiving the high frequency signals. However, it can also fulfill all additional desired functions of the piston position detection unit resulting in a compact self-sufficient unit. Consequently, the piston position detection unit may be designed as a so called smart sensor. This means that in addition to the actual sensor, means for determining, calculating, evaluating and transmitting the data are contained in the piston position detection unit. The temperature may be part of this data.

The housing of the piston position detection unit may be especially made of a plastic material or a ceramic material. The material and the structure of the housing are chosen such that they are suitable to be used in this region being subjected to high pressure. It is possible that a pressure of approximately 600 bar or more prevails in this region of a piston and cylinder unit—depending on its dimensioning.

The material of the housing of the piston position detection unit is furthermore chosen such that it is permeable for high frequency signals. For this reason, for example metal materials are not suitable.

The housing may be made of a thermoplastic plastic material, especially a polyaryletherketone, especially polyetheretherketone (PEEK). Such plastic materials have the above-described desired properties of high pressure resistance and permeability for high frequency signals at the same time. It has been found out that a housing of PEEK can be used at a pressure of up to 800 bar or more without problem.

The housing of the piston position detection unit may be designed to be cylindrical. This design allows for simple assembly of the piston position detection unit in the mounting bore. Other shapes, as rectangular or oval, for example, are also possible.

The housing may include a first channel and a second channel at its outer circumference, a seal being arranged in each of the channels. These two seals serve to seal the interior of the cylinder against the surroundings in the region in which the mounting bore is located. The connection of the mounting bore to the interior of the cylinder is realized by the sensor signal bore. The sensor signal bore is arranged between the first channel and the second channel as seen in the radial direction.

The effective sealing surfaces of the seals may be substantially equally great. In this way, an arrangement of the piston position detection unit in the mounting bore being neutral concerning forces is attained. This results in the piston position detection unit not having to be secured at all or only having to be secured by simple securing means in the mounting bore. The piston position detection unit may be fixed by a simple securing element, for example a securing ring. However, it is also possible to fix the piston position detection unit by a screw connection in the mounting bore, for example.

The piston position detection unit may include a connection element for transmitting data from the electronic unit, the connection element being connected to the electronic unit and to the housing. The connection element may be a cabled or wireless connection element. In case of a cabled connection element, it is a plug or a socket. A possible suitable example for this is a M12 plug and a M12 socket, respectively. However, wireless transmission by Wi-Fi, Bluetooth or a different suitable wireless transmission standard is also possible.

The piston and cylinder unit, with the exception of a part of the connection element, may be completely arranged in the mounting bore. It may also be completely arranged in the mounting bore. This means that the outer shape of the piston and cylinder unit is not changed compared to a piston and cylinder unit not including such a piston position detection unit. Consequently, there is no need for geometrical adaptation of the working machine.

The electronic unit may include the antenna for sending and receiving high frequency signals through the housing. The antenna may be arranged on the electronic unit and the electronic unit may be arranged in the housing such that the high frequency signals are directed through the sensor signal bore. In this way, the material of the housing and the free space provided by the sensor signal bore allow for undisturbed sending and receiving of high frequency signals.

The housing may include a first aligning element and the electronic unit may include a corresponding second aligning element, wherein the first aligning element and the second aligning element are coordinated in a way that the electronic unit is fully mountable in the housing only in exactly one orientation. In this way, incorrect assembly of the electronic unit in the housing is prevented.

The first aligning element may be designed as a groove being arranged eccentrically in an axial end region of the housing and the second aligning element may be designed as a tongue being arranged equally eccentrically in a corresponding axial end portion of the electronic unit. The aligning elements commonly form a tongue and groove connection. The tongue can thus be arranged in the groove only in exactly one relative arrangement with respect to the groove. A third aligning element may be arranged at the housing and a corresponding fourth aligning element may be arranged at the mounting bore and at the cylinder, respectively. The third aligning element may be a protrusion, for example, and the fourth aligning element may be a recess or vice versa. Other geometrical designs are also possible. In this way, it is ensured that the housing can be arranged in the cylinder of the piston and cylinder unit only in exactly one orientation.

Due to the aligning elements, it is overall achieved that the main sense of direction of radiation of the antenna is correctly aligned. The main sense of direction of radiation of the antenna then extends perpendicularly to the longitudinal center axis of the housing of the piston position detection unit and along the longitudinal axis of the piston and cylinder unit or parallel thereto. The main sense of direction of radiation of the antenna extends in the direction of the sensor signal bore and of the piston.

The piston position detection unit may include a housing an electronic unit being arranged in the housing. The piston position detection unit may be arranged in the mounting bore and designed such that the interior of the cylinder is sealed against the surroundings of the piston and cylinder unit and that the electronic unit is removable from the housing and insertable into the housing without cancelling the sealing effect. In this way, assembly of the electronic unit in the housing and disassembly of the electronic unit from the housing is possible while the piston and cylinder unit is filled with oil. This means that, in case of a technical malfunction, the electronic unit can be removed from the housing while the housing remains located in the mounting bore.

The high frequency signals may be microwave signals.

The high frequency signals may have a frequency of at least 20 GHz, especially at least 50 GHz, especially at least 100 GHz, especially between 20 GHz and 400 GHz, especially between 100 GHz and 400 GHz, especially between 100 GHz and 300 GHz, especially between 100 GHz and 150 GHz, especially approximately 120 GHz.

The high frequency signals may be continuous wave radar signals. The high frequency signals may be especially frequency modulated continuous wave radar signals. It is possible to send different frequencies in a certain order. For example, these may be frequencies of 120 GHz, 121 GHz and 122 GHz and so forth.

A frequency modulated continuous wave radar (FMCW radar) continuously sends a sending signal the frequency of which changes. In contrast to an unmodulated radar (CW radar), a frequency modulated continuous wave radar can change its operating frequency during the measurement. Due to this change of the frequency, the time reference required for measuring the distance to the measured object (here: the piston) is provided. The distance measurement is then realized by a frequency comparison of the received signals with the sent signals. Since this measurement principle taken in isolation is known from the prior art, it is not further described and instead it is referred to the article "continuous-wave radar" at WIKIPEDIA (https://en.wikipedia.org/wiki/Continuous-wave_radar).

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if a collimator is mentioned, this is to be understood such that there is exactly one collimator or there are two collimators or more collimators. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

FIG. 1-9 illustrate different views of a first exemplary embodiment of a new piston and cylinder unit 1 as well as its parts.

Figure 1:
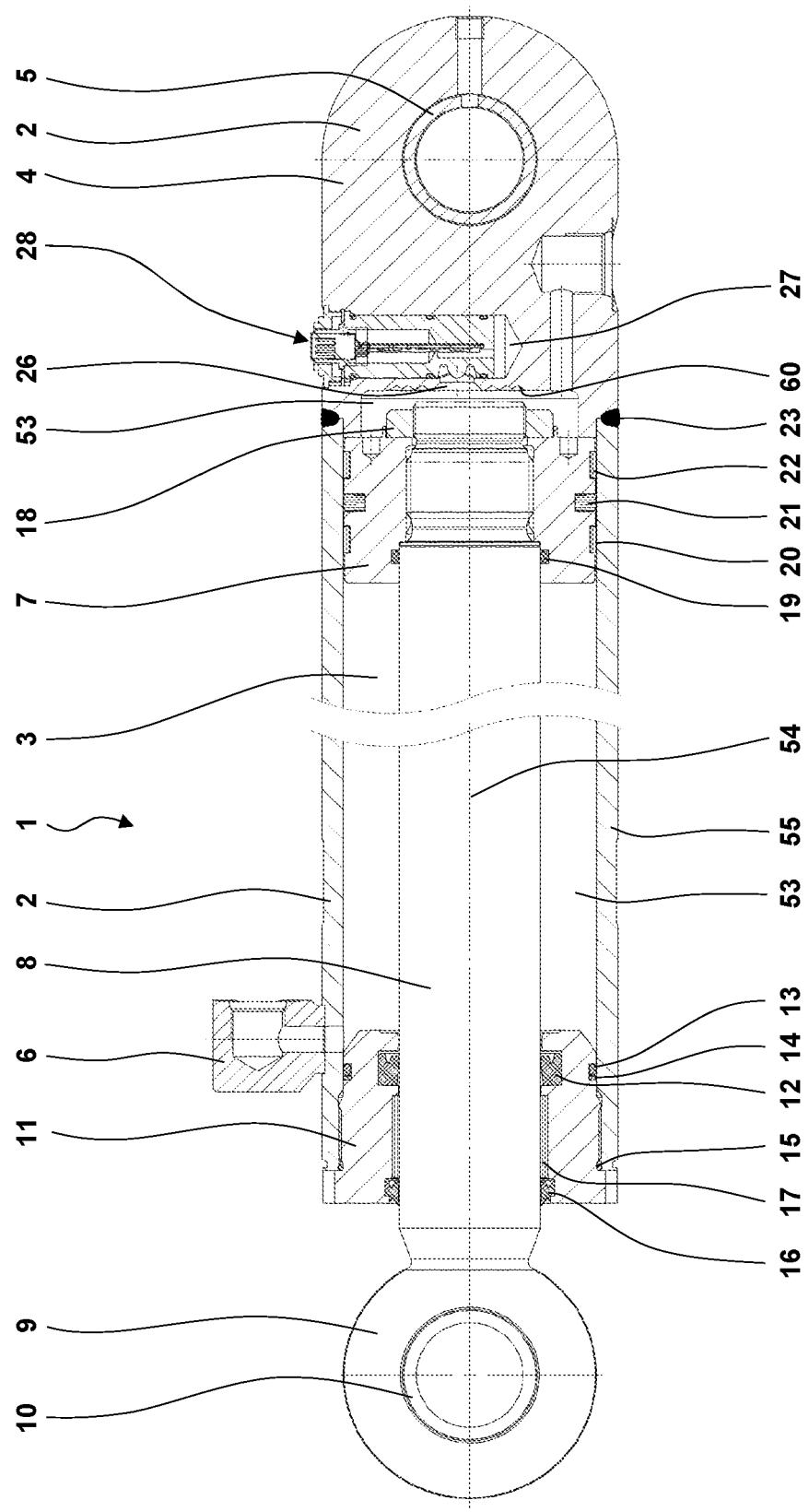
FIG. 1 illustrates a sectional view of a first exemplary embodiment of a new piston and cylinder unit including a new piston position detection unit.
Figure 2:
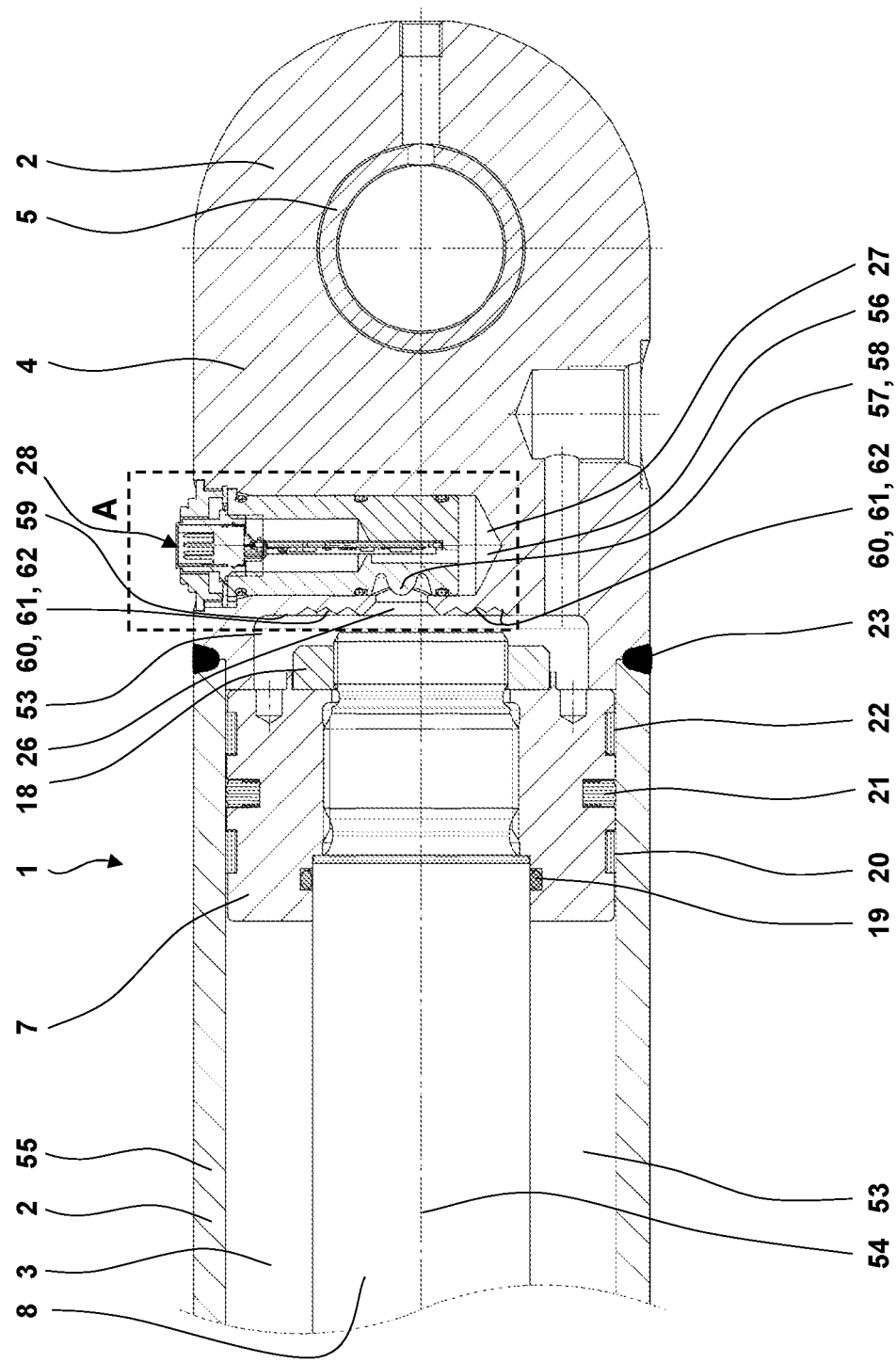
FIG. 2 illustrates an enlarged view of a part of the piston and cylinder unit according to FIG. 1.
Figure 3:
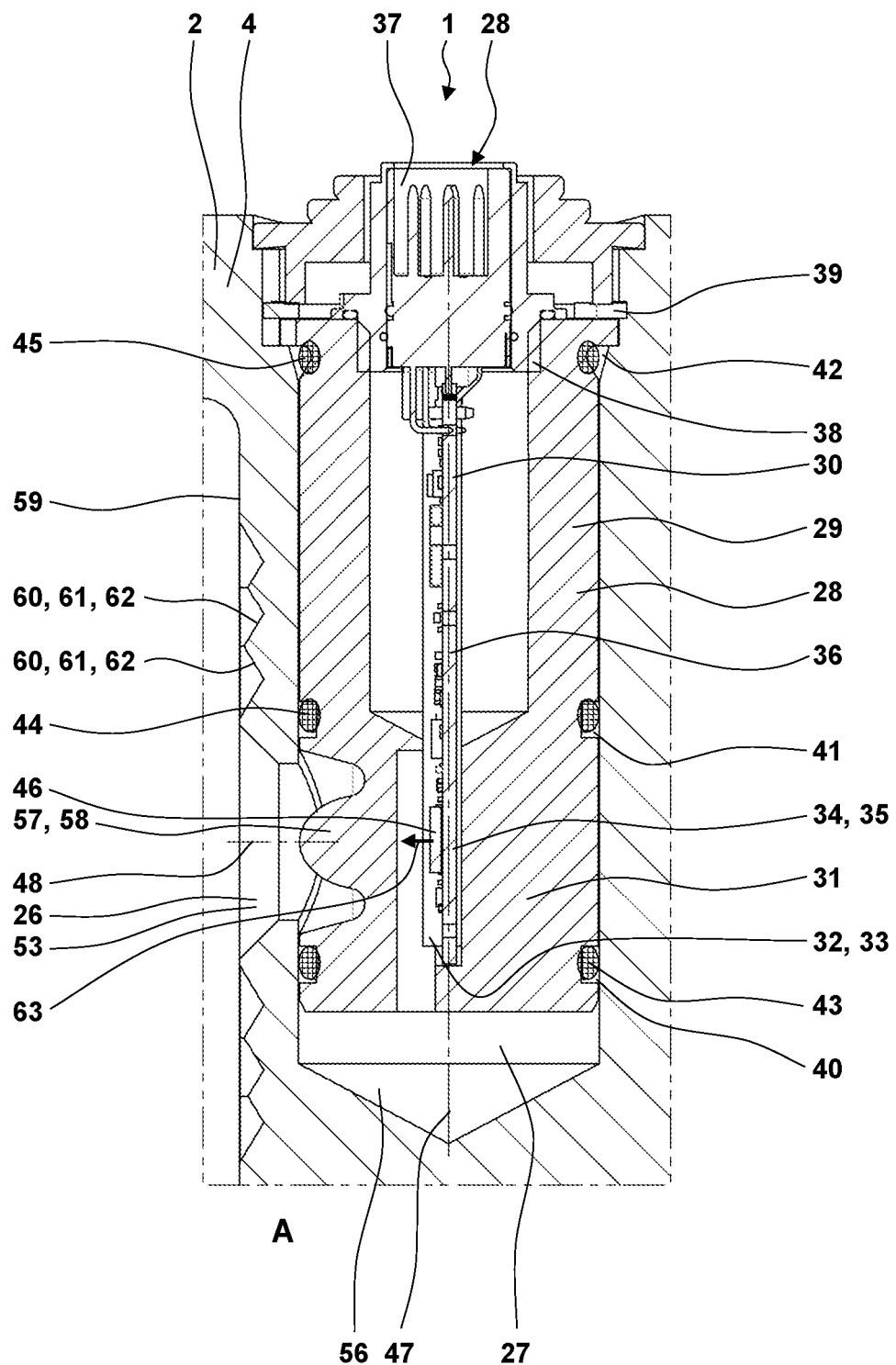
FIG. 3 illustrates the detail A of the piston and cylinder unit of FIG. 2.

In FIG. 1, the discontinuation lines indicate that the piston and cylinder unit 1 actually is designed to be longer and that only a part is illustrated. Similar discontinuation lines exist in FIGS. 2, 4 and 5. In FIG. 3, the illustration ends at the straight discontinuation lines. The same applies to FIGS. 9, 10, 11 and 12.

The piston and cylinder unit 1 includes a cylinder 2 including a cylinder tube 55, an interior 3 and a cylinder head 4. In the region of the cylinder head 4, a bearing bushing 5 for the support of the piston and cylinder unit 1 at a working machine (not illustrated) is arranged.

In the present example, since it is a hydraulic piston and cylinder unit 1, the interior 3 is filled with oil 53. For this purpose, the cylinder 2 includes an oil connection 6 and an oil connection 24. Oil lines (not illustrated) are connected to the oil connections 6, 24. A hydraulic pump (not illustrated) subjects the piston 7 by the oil 53 with pressure in a way as it is known taken in isolation such that the piston 7 and the piston rod 8 being connected therewith move in the respective sense of direction along the longitudinal center axis 54 of the piston and cylinder unit 1. In this way, oil enters through the oil connections 6, 24 into the interior 3 of the cylinder 2 and exits from the interior 3, respectively, depending on the sense of direction of the movement of the piston 7 within the cylinder 2. FIGS. 1 and 2 illustrate the position of the piston 7 all the way to the right—i.e. the retracted position of the piston and cylinder unit 1.

As it has been described above, the piston and cylinder unit 1 includes the piston 7. The piston 7 is connected to the piston rod 8, a piston rod eye 9 being arranged at one of its axial ends. The piston rod eye 9 also includes a bearing bushing 10. The bearing bushing 10 serves for the operative connection of the piston 9 with a tool (not illustrated) or a different part of the working machine.

The piston rod 8 is supported by a guiding bushing 11 to be translationally movable in an axial direction along the longitudinal center axis 54. A rod seal 12, an O-ring 13 and a supporting ring 14 are provided for supporting and sealing. Another O-ring 15, a scraper 16 and a slide bearing 17 are arranged at the other axial end of the guiding bushing 11.

The piston 7 is fixedly arranged on the piston rod 8 such that they cannot be rotated with respect to one another and it is secured by a locking nut 18. Furthermore, an O-ring 19, a piston guiding ring 20, a piston seal 21, another piston guiding ring 22 and a welding seam 23 are located at the piston 7.

In this way, the piston 7 is commonly supported with the piston rod 8 and the piston rod eye 9 to be movable back and forth within the cylinder tube 55 of the cylinder 2.

A chamber 25 in the cylinder head 4 is connected to the part of the interior 3 which is formed by the cylinder tube 55. The chamber 25 also forms a part of the interior 3 and is filled with oil 53. The chamber 25 is connected to the oil connection 24. An axially extending sensor signal bore 26 is connected to the chamber 25. The sensor signal bore 26 is also connected to the interior 3 and filled with oil 53.

The sensor signal bore 26 is connected to a mounting bore 27 extending radially in the cylinder 2. The mounting bore 27 extends to the outer surface of the cylinder head 4 and may be connected to the surroundings by a compensation bore (not illustrated).

The cylinder head 4 includes a cylinder head bottom surface 59 extending annularly around the sensor signal bore 26. A plurality of been deflecting elements 60 is arranged in the cylinder head bottom surface 59. In the illustrated case, these are recessed elements 61 being designed as a spaced apart conical impressions 62. The function of the beam deflecting elements 60 will be described below.

A piston position detection unit 28 is arranged in the mounting bore 27. The piston position detection unit 28 serves to detect the axial position of the piston 7 in the cylinder 2 by high frequency technology. The details of the piston position detection unit 28 are to be best seen in the enlarged illustration according to FIG. 3 and the exploded view according to FIG. 5. The structure of the electronic unit 30 is illustrated in FIG. 6 in greater detail. For reasons of clarity of the drawings, the components of the piston position detection unit 28 have not been designated with reference numerals in FIGS. 1 and 2.

The piston position detection unit 28 includes a housing 29 and an electronic unit 30 being arranged in the housing 29.

The piston position detection unit 28 includes a collimator 57. In the illustrated case, the collimator 57 forms a part of the housing 29. However, the collimator 57 could also be arranged in the housing 29 or outside of the house and 29. In the illustrated case, the collimator 57 is designed as a dielectric lens 58. The function of the collimator 57 will be described below.

Figure 5:
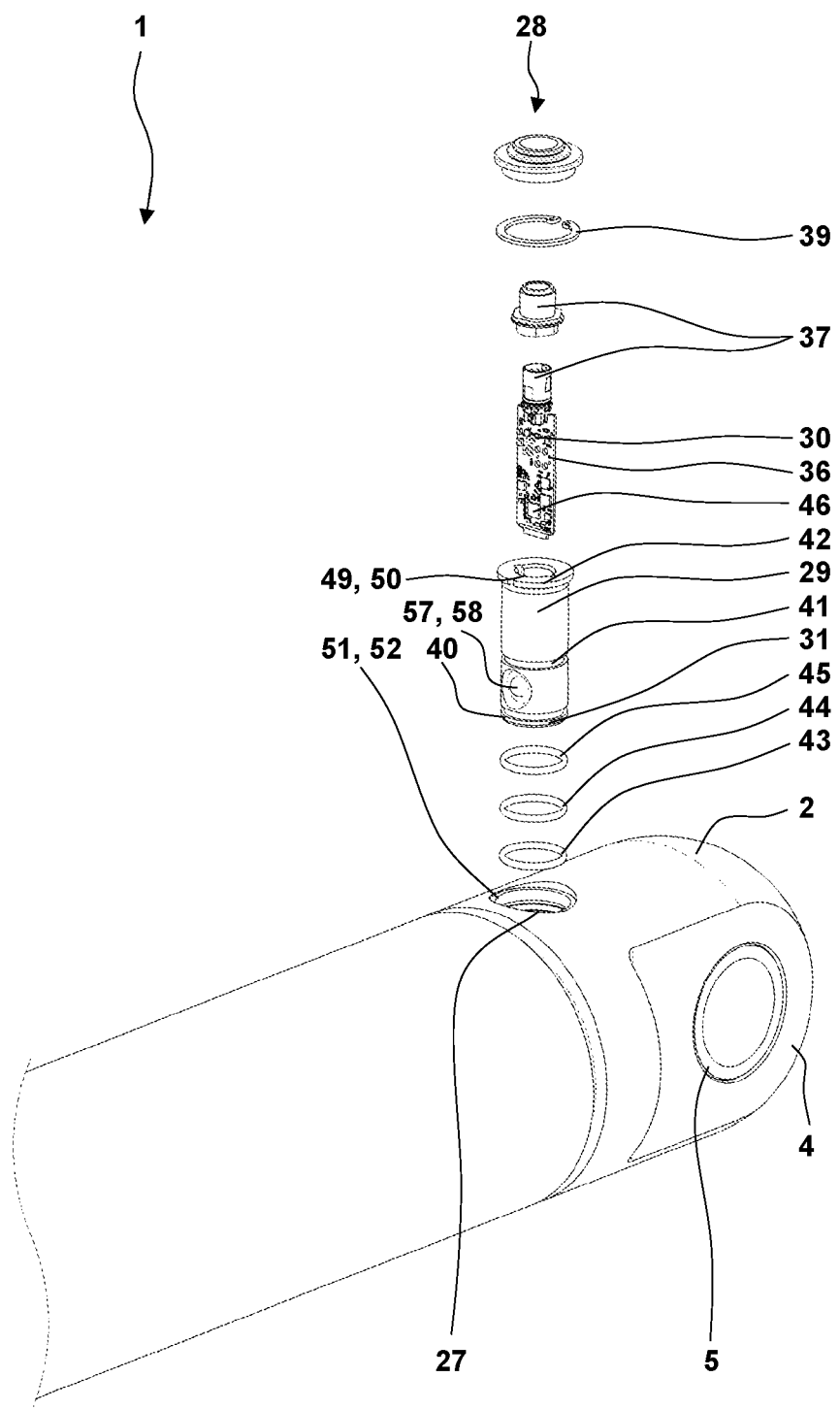
FIG. 5 illustrates a perspective exploded view of a part of the piston and cylinder unit according to FIG. 1.
Figure 6:
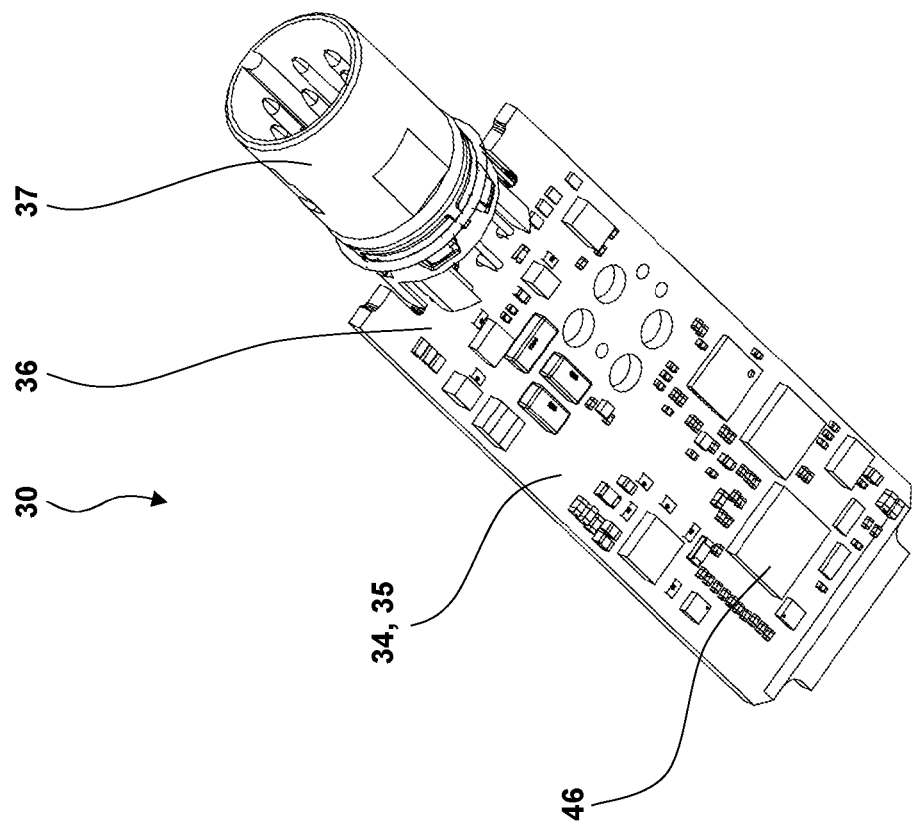
FIG. 6 illustrates a perspective view of an exemplary embodiment of an electronic unit of the piston position detection unit of the piston and cylinder unit according to FIG. 1.
Figure 7:
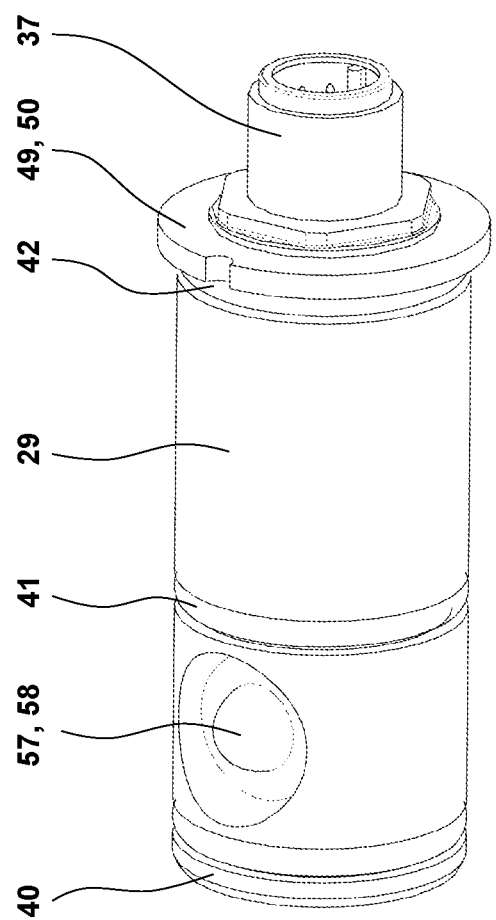
FIG. 7 illustrates a perspective view of the piston position detection unit of the piston and cylinder unit according to FIG. 1 including an integrated collimator.
Figure 8:
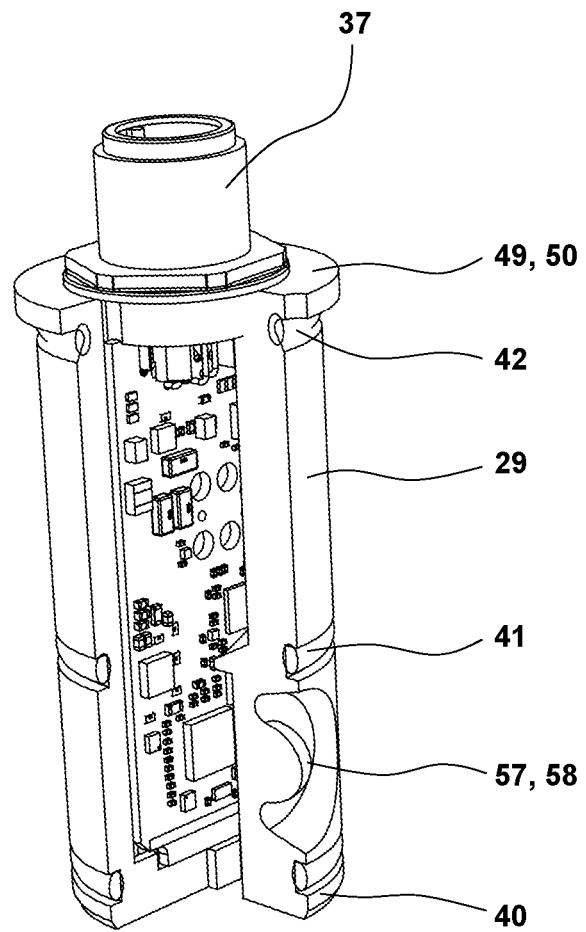
FIG. 8 illustrates a partly sectional perspective view of the piston position detection unit according to FIG. 7.
Figure 9:
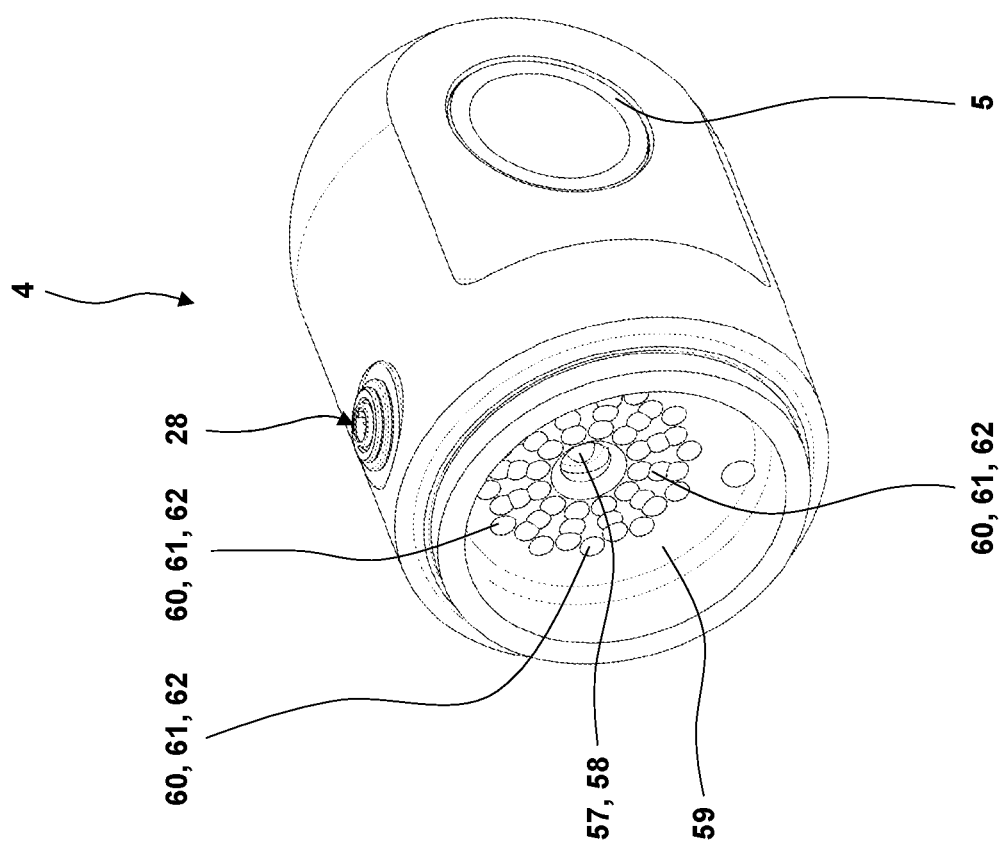
FIG. 9 illustrates a perspective view of the cylinder head of the piston and cylinder unit according to FIG. 1.
Figure 10:
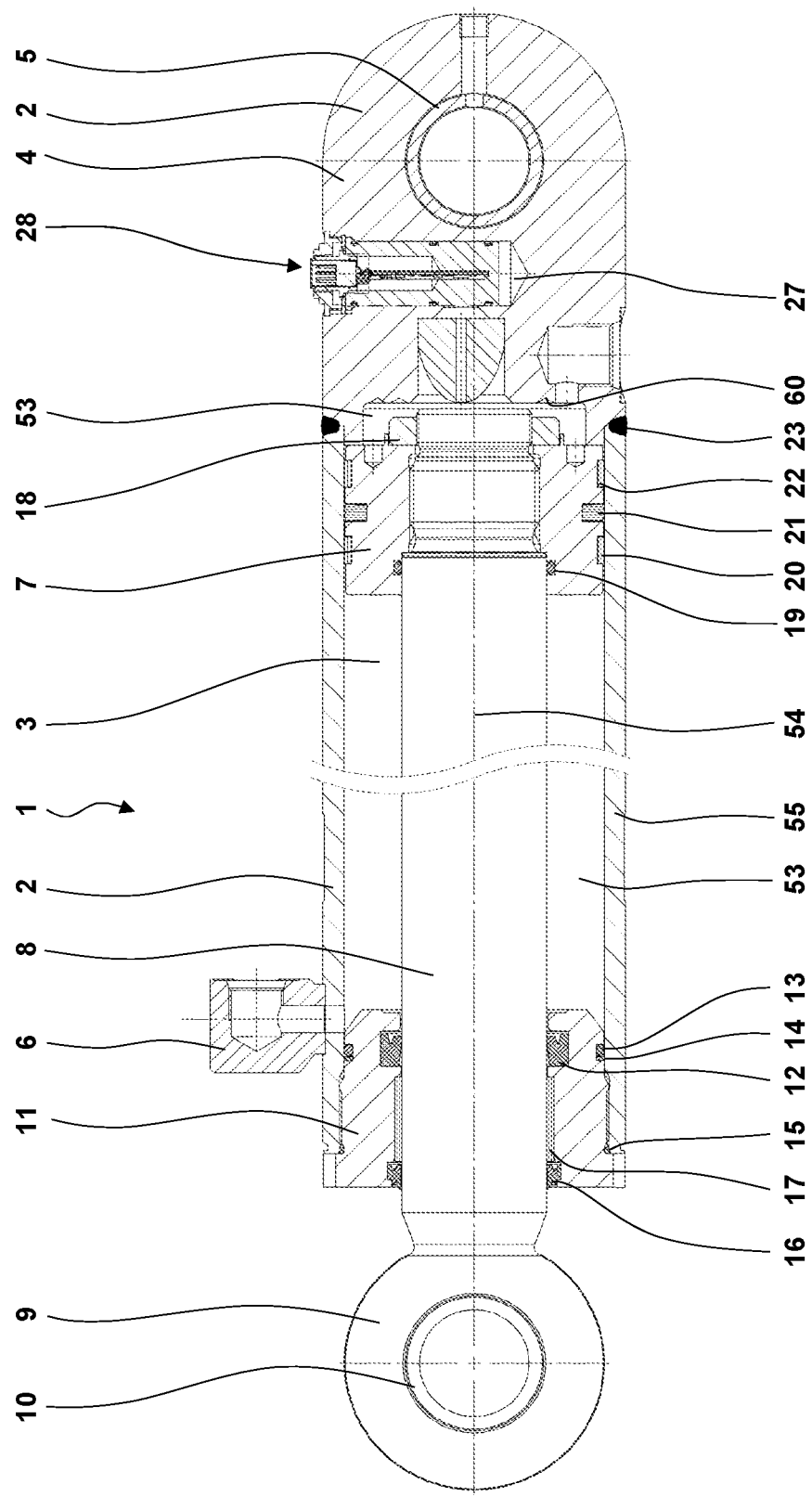
FIG. 10 illustrates a sectional view of a second exemplary embodiment of the new piston and cylinder unit including the new piston position detection unit.
Figure 11:
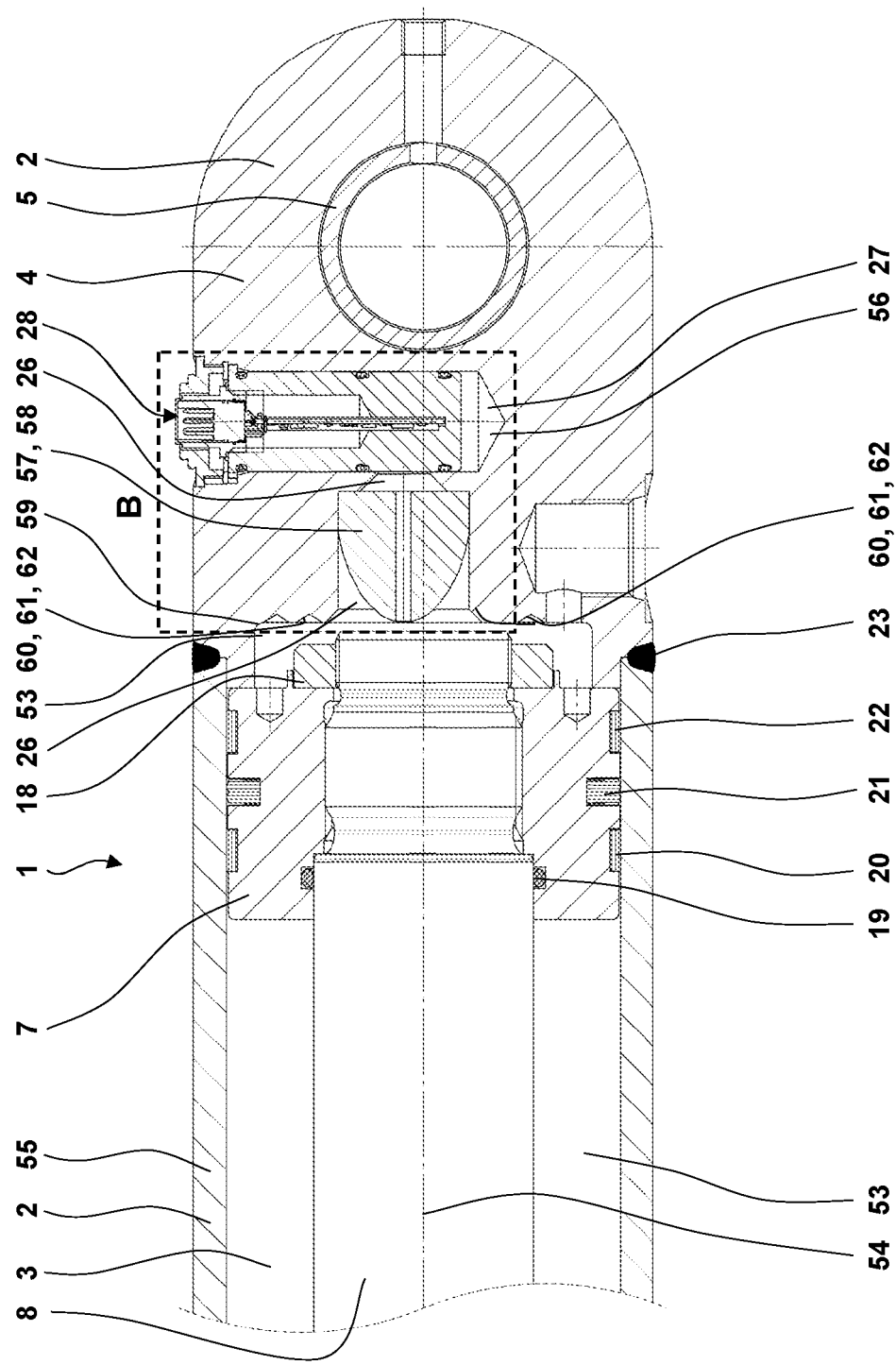
FIG. 11 illustrates an enlarged view of a part of the piston and cylinder unit according to FIG. 10.
Figure 12:
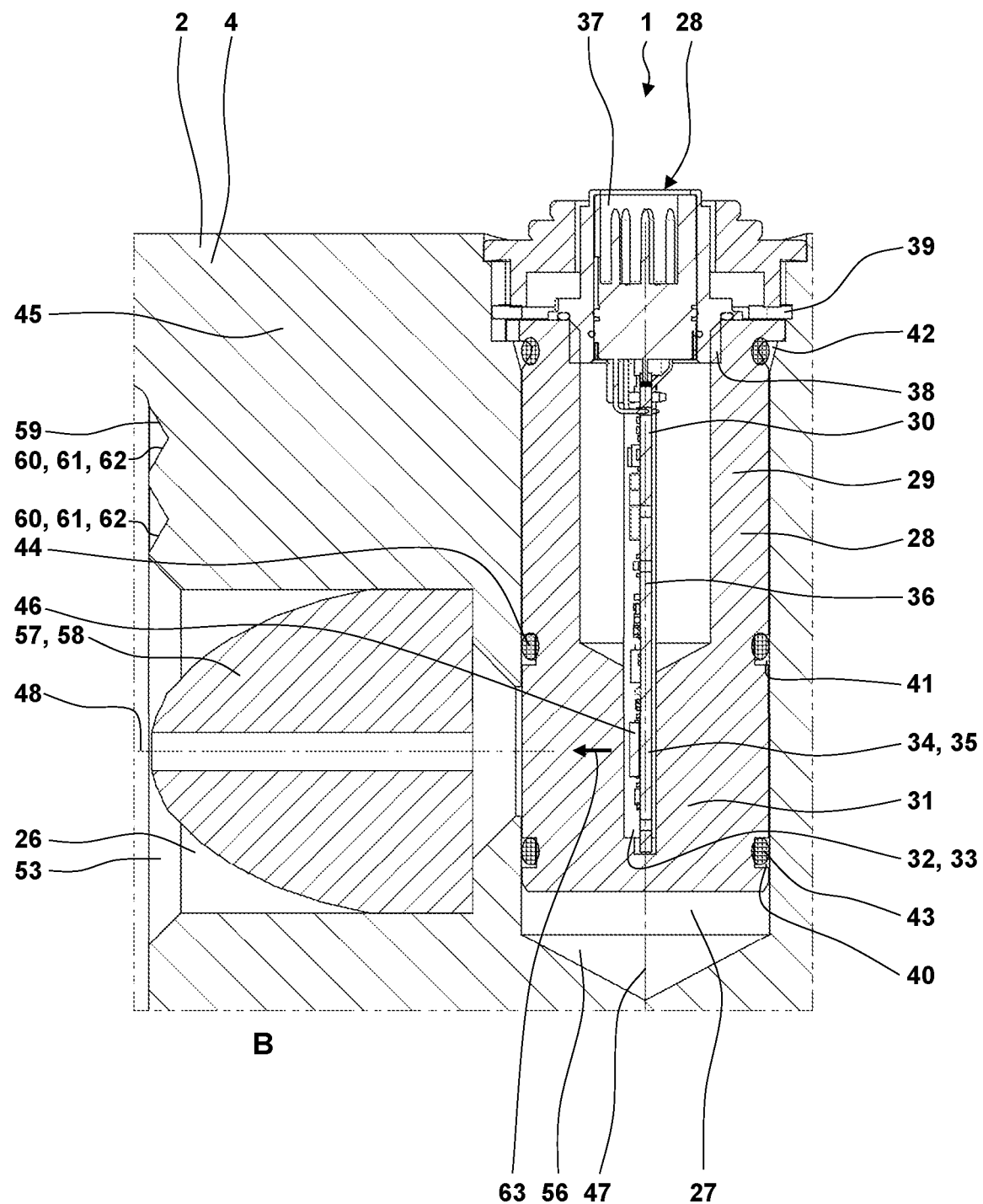
FIG. 12 illustrates the detail B of the piston and cylinder unit of FIG. 11.
Figure 13:
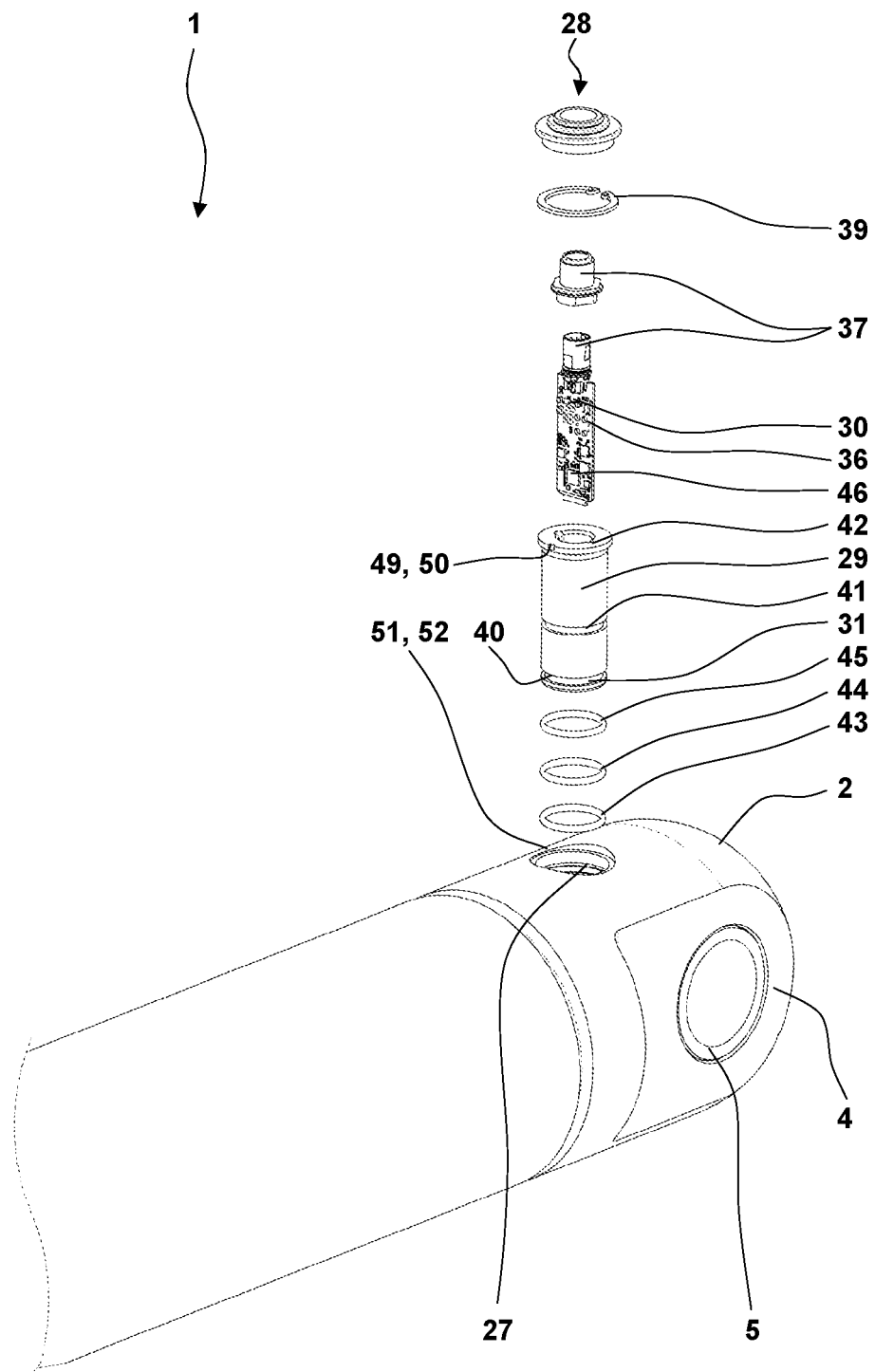
FIG. 13 illustrates a perspective exploded view of a part of the piston and cylinder unit according to FIG. 10.
Figure 14:
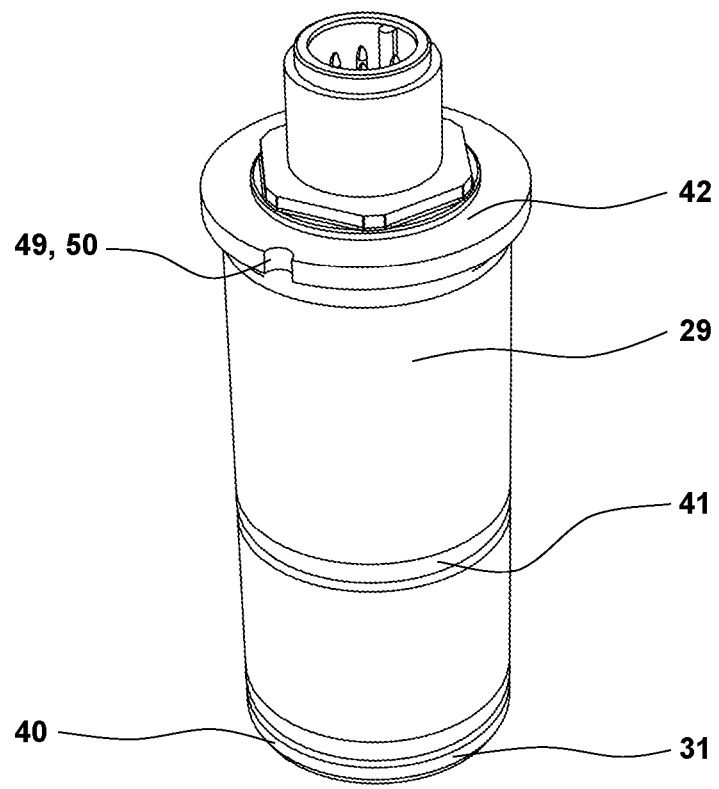
FIG. 14 illustrates a perspective view of the piston position detection unit of the piston and cylinder unit according to FIG. 10.
Figure 15:
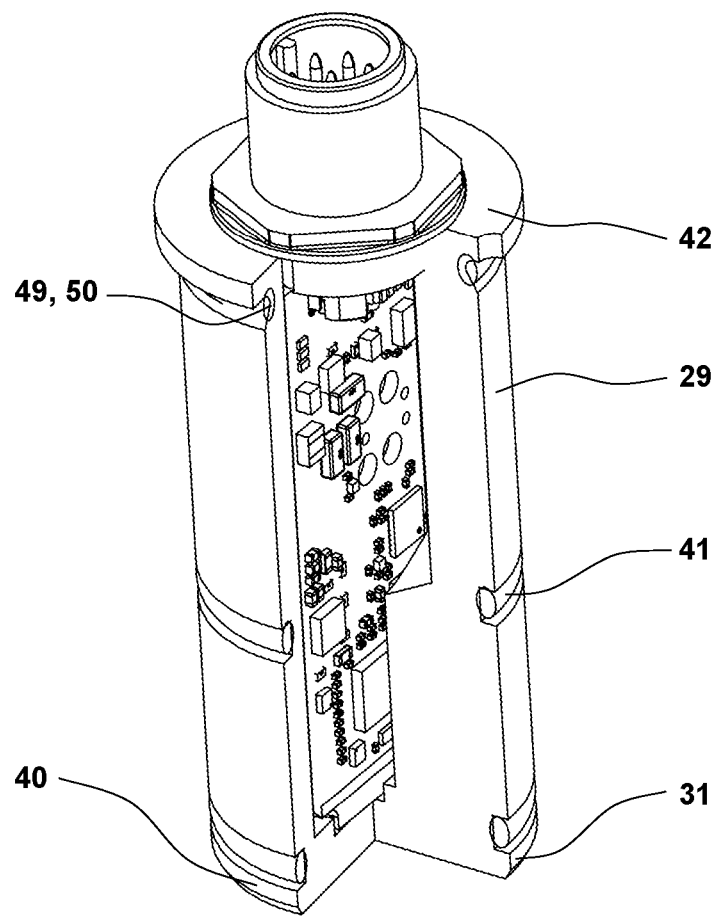
FIG. 15 illustrates a partly sectional perspective view of the piston position detection unit according to FIG. 14.
Figure 16:
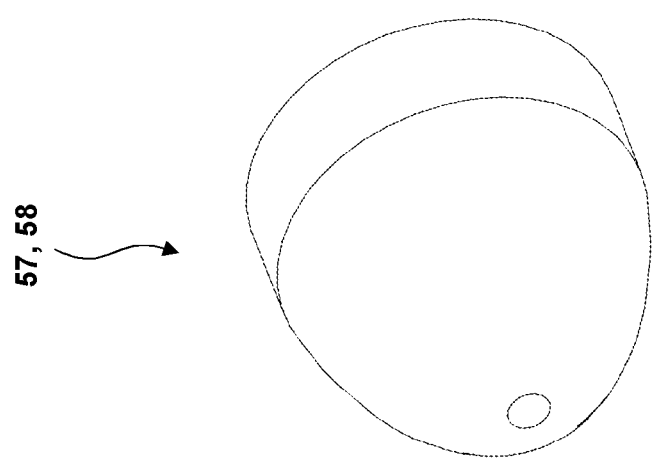
FIG. 16 illustrates a perspective view of the collimator of the piston and cylinder unit according to FIG. 10.
Figure 17:
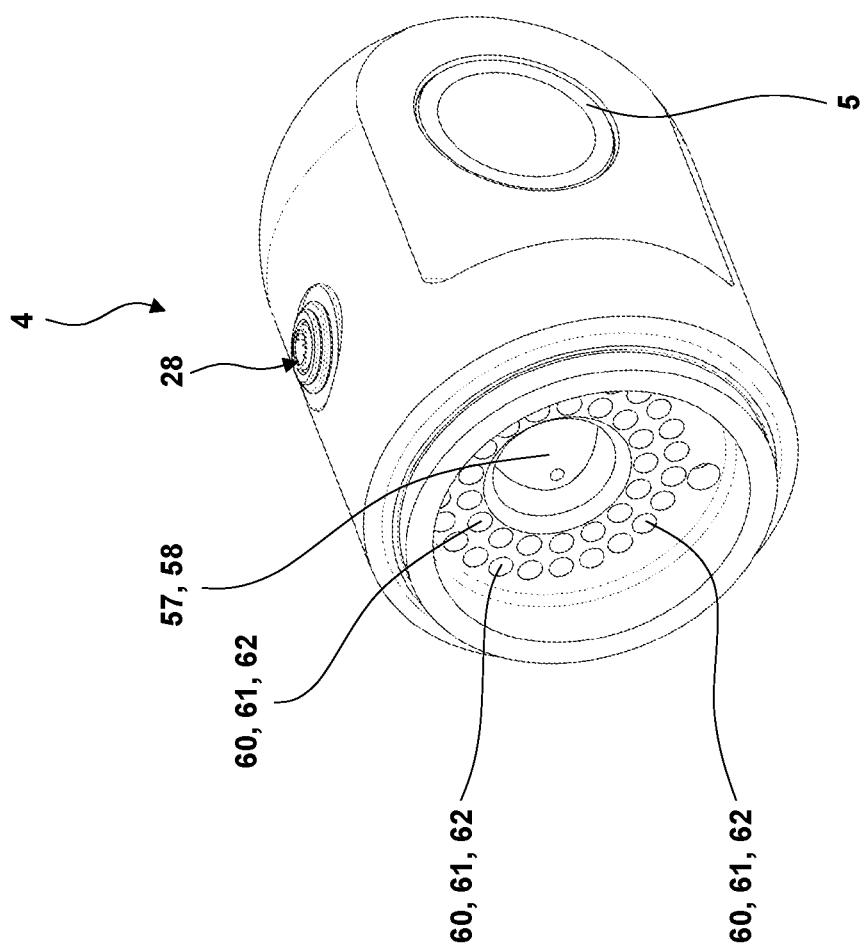
FIG. 17 illustrates a perspective view of the cylinder head of the piston and cylinder unit according to FIG. 10.

The housing 29 is designed to be cylindrical and it is closed by a bottom 31 at its lower end (see FIG. 5). The opposite upper end is open such that the electronic unit 30 can be inserted there. The housing 29 is made of a material being permeable for high frequency signals. The material especially is a thermoplastic plastic material.

The housing 29 includes a first aligning element 32 in the region of its closed bottom 31, the first aligning element 32 being designed as a groove 33 and being arranged eccentrically in the cylindrical housing 29. A second aligning element 34 of the electronic unit 30 engages the first aligning element 32. The second aligning element 34 is designed as a tongue 35. In this way, a tongue and groove connection is formed. The second aligning element 34 is also arranged eccentrically at the electronic unit 30. In this example, the tongue 35 is formed by a board 36 of the electronic unit 30. Thus, the entire board 36 is arranged eccentrically. However, this could also be realized in a different way.

The correct alignment of the housing 29 in the mounting bore 27 is realized by a third aligning element 49. In this example, the third aligning element 49 is designed as a protrusion 50 being located at the housing 29. The mounting bore 27 includes a corresponding fourth aligning element 51 being designed as a recess 52 in this case. To improve perceptibility, this region is additionally illustrated at an enlarged scale in FIG. 4.

At its opposite axial end, the board 36 is connected to a connection element 37 for transmitting data from the electronic unit 30. The connection element 37 in its mounted position is connected to the electronic unit 30 as well as to the housing 29. The connection to the housing 29 is realized by a threaded connection 38, for example. In the present case, the connection element 37 is a M12 plug. However, it could also be a different connection element 37. The housing 30 and thus the piston position detection unit 28 are securely mounted in the mounting bore 27 by a securing ring 39.

The housing 29 includes a first channel 40, a second channel 41 and a third channel 42 at its outer circumference. A first seal 43 is arranged in the first channel 40, a second seal 44 is arranged in the second channel 41 and a third seal 45 is arranged in the third channel 42. The first seal 43 being located in the first channel 40 serves to seal against the surroundings.

The seals 44, 45 form a pair of seals and serve to seal the interior 3 of the cylinder 2 being filled with oil 53. The sensor signal bore 26 in which oil 53 is located is arranged between the first channel 40 and the second channel 41 in a radial direction—i.e. in the direction of the longitudinal center axis 47. The effective sealing surfaces of the seals 44, 45 are approximately equally great such that an arrangement of the piston position detection unit 28 in the mounting bore 27 being neutral concerning forces is attained.

A number of electronic components is arranged on the board 36. One of these components is an antenna 46 being designed to send and receive high frequency signals through the housing 29. The other components serve to determine, calculate, evaluate and transmit data in the piston position detection unit 28. Taken in isolation, they are known to the skilled person and thus not further described.

The antenna 46 is arranged on the board 36, the board 36 is arranged in the housing 29 and the housing 29 is aligned in the cylinder head 4 such that the high frequency signals of the antenna 46 are directed through the sensor signal bore 26. The main sense of direction of radiation of the antenna 46 thus extends perpendicularly to the longitudinal center axis 47 of the housing 29. Thus, the main sense of direction of radiation of the antenna 46 extends along the longitudinal center axis 48 of the sensor signal bore 26 or offset thereto in a way that the high frequency signals are directed from the antenna 46 through the collimator 57 and the signal bore 26 onto the piston 7 and that the signals reflected by the piston 7 can be received by the antenna 46.

During operation of the piston position detection unit 28, it sends high frequency signals by the antenna 46 through the collimator 57, the housing 29, the sensor signal bore 26 and—depending on the position of the piston 7—through a part of the interior 3. The signals encounter the piston 7, they are reflected by the piston 7 and they return along the same path and are received by the antenna 46.

Precision of the piston position detection unit 28 is improved in several ways by the collimator 57. The collimator 57 generates a beam path of parallel beams of previously non-parallel beams and vice versa. In the sending sense of direction, the collimator 57 thus converts the non-parallel beams originating from the antenna 46 into parallel beams. In the opposite receiving sense of direction, the collimator 57 bundles the parallel signals entering the collimator 57 that had been collected by the piston 7. The signals are bundled such that they are received by the antenna 46.

The precision of the piston position detection unit 28 is further improved by the beam deflecting elements 60. The beam deflecting elements 60 deflects signals that had already been deflected before (=false signals) intentionally such that their angle strongly deviates from the direction parallel to the longitudinal center axis 54 of the piston 7. As a result, the path of the false signals through the oil 53 is correspondingly prolonged and the dampening of the false signals is correspondingly increased. Eventually, these false signals do not reach the antenna 46 at all or with a lower probability and/or only dampened.

The electronic unit 30 with its additional electronic components and the software executed by these components carries out an evaluation and thus determines the current position of the piston 7 along the longitudinal center axis 54. This determination can be conducted permanently, in defined time intervals or at specific points in time. By the connecting element 37, the result or a command being associated with the result is transmitted to an electronic computing unit of the working machine connected therewith—a part of which is the piston and cylinder unit 1.

Figure 4:
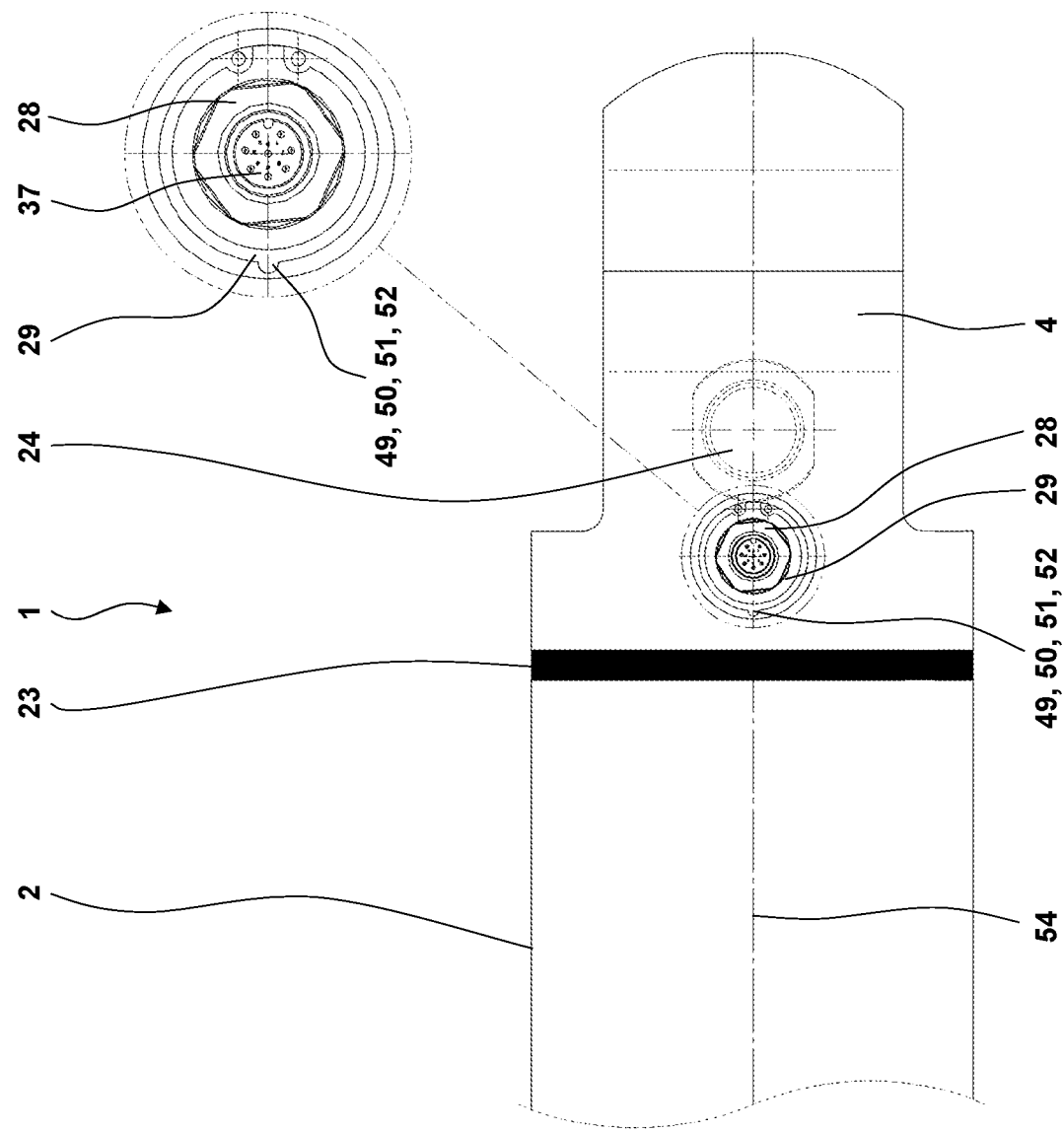
FIG. 4 illustrates a view of a part of the piston and cylinder unit according to FIG. 1 from above.

FIGS. 10-17 illustrate different views of a second exemplary embodiment of the new piston and cylinder unit 1 as well as its parts. FIGS. 4 and 6 also concern this embodiment. Since the first and second exemplary embodiments of the piston and cylinder unit 1 have a lot in common, it is referred to the above statements.

However, the piston position detection unit 28 and the sensor signal bore 26 have a different design. The collimator 57 is a separate component being arranged in the enlarged sensor signal bore 26.

Many variations and modifications may be made to the preferred embodiments of the invention without departing substantially from the spirit and principles of the invention. All such modifications and variations are intended to be included herein within the scope of the present invention, as defined by the following claims.

We claim:

1. A piston and cylinder unit, comprising:
    a cylinder, the cylinder including an interior extending axially in the cylinder and a mounting bore extending radially in the cylinder;
    a piston, the piston being supported in the interior of the cylinder to be axially movable along a longitudinal center axis;
    a piston position detection unit, the piston position detection unit being arranged in the mounting bore and being designed and arranged to detect the axial position of the piston in the cylinder by high frequency technology, the piston position detection unit including an antenna for sending and receiving high frequency signals along a beam path, the antenna having a main sense of direction of radiation extending parallel to the longitudinal center axis of the piston, wherein the antenna is arranged in a housing having a longitudinal housing axis, and wherein the longitudinal housing axis is perpendicular to the longitudinal center axis of the piston; and
    a collimator, the collimator being arranged in the beam path of the antenna.

2. The piston and cylinder unit of claim 1, wherein the collimator includes a dielectric lens.

3. The piston and cylinder unit of claim 1, wherein the collimator is an integral part of the piston position detection unit.

4. The piston and cylinder unit of claim 2, wherein the collimator is an integral part of the piston position detection unit.

5. The piston and cylinder unit of claim 1, wherein
    the cylinder includes a cylinder tube and a cylinder head;
    the mounting bore is arranged in the cylinder head; and
    the piston position detection unit is arranged in the mounting bore such that its longest dimension extends radially in the cylinder head.

6. The piston and cylinder unit of claim 1, the piston and cylinder unit further comprising a sensor signal bore extending in an axial direction, the mounting bore being operatively connected to the interior of the cylinder by the sensor signal bore.

7. The piston and cylinder unit of claim 5, the piston and cylinder unit further comprising a sensor signal bore extending in an axial direction, the mounting bore being operatively connected to the interior of the cylinder by the sensor signal bore, and wherein the cylinder head includes a cylinder head bottom surface surrounding the sensor signal bore, a plurality of beam deflecting elements being arranged in the cylinder head bottom surface.

8. The piston and cylinder unit of claim 1, wherein the piston position detection unit includes a housing and an electronic unit being arranged in the housing.

9. The piston and cylinder unit of claim 8, wherein the collimator is at least partly arranged in the housing and partly forms the housing, respectively.

10. The piston and cylinder unit of claim 8, wherein
    the electronic unit includes the antenna, the antenna being designed to send and receive high frequency signals through the housing; and
    the antenna is arranged on the electronic unit, the antenna being arranged in the housing such that the high frequency signals are directed through the sensor signal bore.

11. The piston and cylinder unit of claim 8, wherein the housing includes a first aligning element and the electronic unit includes a corresponding second aligning element, the first aligning element and the second aligning element being coordinated in a way that the electronic unit is fully mountable in the housing only in exactly one orientation.

12. The piston and cylinder unit of claim 11, wherein the first aligning element is designed as a groove being arranged eccentrically in an axial end region of the housing and that the second aligning element is designed as a tongue being arranged equally eccentrically in a corresponding axial end portion of the electronic unit.

13. The piston and cylinder unit of claim 1, wherein the piston position detection unit includes a housing and an electronic unit being arranged in the housing, the piston position detection unit being arranged in the mounting bore and being designed such that the interior of the cylinder is sealed against the surroundings of the piston and cylinder unit and that the electronic unit is removable from the housing and insertable into the housing without cancelling the sealing effect.

14. The piston and cylinder unit of claim 1, wherein the main sense of direction of radiation of the antenna extends perpendicularly to the longitudinal housing axis and parallel to the longitudinal center axis of the piston.

15. A piston position detection unit for detecting the position of a piston, wherein the piston is axially movable along a longitudinal piston axis in a cylinder of a piston and cylinder unit, comprising:
    a housing being designed to be cylindrical and having a longitudinal housing axis, the housing being separate from the cylinder;
    an electronic unit being arranged in the housing and including an antenna for sending and receiving high frequency signals through the housing along a beam path, the main sense of direction of radiation of the antenna extending perpendicularly to the longitudinal housing axis and parallel to the longitudinal piston axis; and
    a collimator being at least partly arranged in the housing or partly forming the housing and being arranged in the beam path of the antenna.

16. The piston position detection unit of claim 15, wherein the collimator includes a dielectric lens.

17. The piston position detection unit of claim 15, wherein the collimator is an integral part of the piston position detection unit.

18. The piston position detection unit of claim 16, wherein the collimator is an integral part of the piston position detection unit.

19. A piston and cylinder unit, comprising:
    a cylinder including an interior extending axially in the cylinder, a mounting bore extending radially in the cylinder, a cylinder tube and a cylinder head including a cylinder head bottom surface;

a piston being supported in the interior of the cylinder to be axially movable along a longitudinal center axis;

a piston position detection unit being arranged in the mounting bore and being designed and arranged to detect the axial position of the piston in the cylinder by high frequency technology, the piston position detection unit including an antenna for sending and receiving high frequency signals along a beam path, the antenna having a main sense of direction of radiation extending parallel to the longitudinal center axis;

a collimator being arranged in the beam path of the antenna; and a plurality of beam deflecting elements being arranged in the cylinder head bottom surface, the beam deflecting elements being designed as impressions located in the cylinder head bottom surface, the impressions being spaced apart and conical.

* * * * *